United States Patent [19]
Steiger et al.

[11] Patent Number: 5,353,913
[45] Date of Patent: Oct. 11, 1994

[54] PACKAGING MACHINE FOR BAKERY PRODUCTS

[75] Inventors: Leslie J. Steiger, Grandview; Laclede L. Hill, Kansas City, both of Mo.; William E. Norton, Edwardsville, Kans.; Randyl C. Hanson, Lake Lotawana, Mo.; Eric C. Scheier, Lenexa, Kans.; Paul M. Bastasch, Overland Park, Kans.

[73] Assignee: United Bakery Equipment Company, Lenexa, Kans.

[21] Appl. No.: 129,584

[22] Filed: Sep. 30, 1993

[51] Int. Cl.⁵ .................................... B65G 47/30
[52] U.S. Cl. .................. 198/418.6; 198/432; 53/248
[58] Field of Search ............... 198/406, 412, 416, 417, 198/418.1, 418.6, 432; 53/247, 248

[56] References Cited
U.S. PATENT DOCUMENTS

| | | | |
|---|---|---|---|
| 3,032,211 | 5/1962 | Wordsworth | 198/418.1 X |
| 3,164,241 | 1/1965 | Atkinson | 198/418.6 X |
| 3,561,189 | 2/1971 | Raudat | 53/248 X |
| 3,570,216 | 3/1971 | Frentzel | 53/248 |
| 4,418,814 | 12/1983 | Rose | 198/418.6 X |
| 5,102,009 | 4/1992 | Kato et al. | 198/418.6 X |

*Primary Examiner*—James R. Bidwell
*Attorney, Agent, or Firm*—Kokjer, Kircher, Bowman & Johnson

[57] ABSTRACT

A packaging machine for round bakery products such as bagels and English muffins. The products are conveyed flatly side by side in successive transverse rows which are delivered by an infeed belt conveyor. The infeed conveyor discharges the products into open top chutes equipped with deflector rods located off center in the chutes. The products are rotationally deflected by the deflector rods to an edge down position. The chutes discharge the bakery products onto a packaging conveyor which receives the products in each group on edge and oriented face to face in a stack which can be conveniently packaged. Each deflector rod can be situated in two different alternative positions offset on opposite sides of the transverse center of the bakery product. This allows the faces of the products in each package to be oriented as desired.

10 Claims, 2 Drawing Sheets

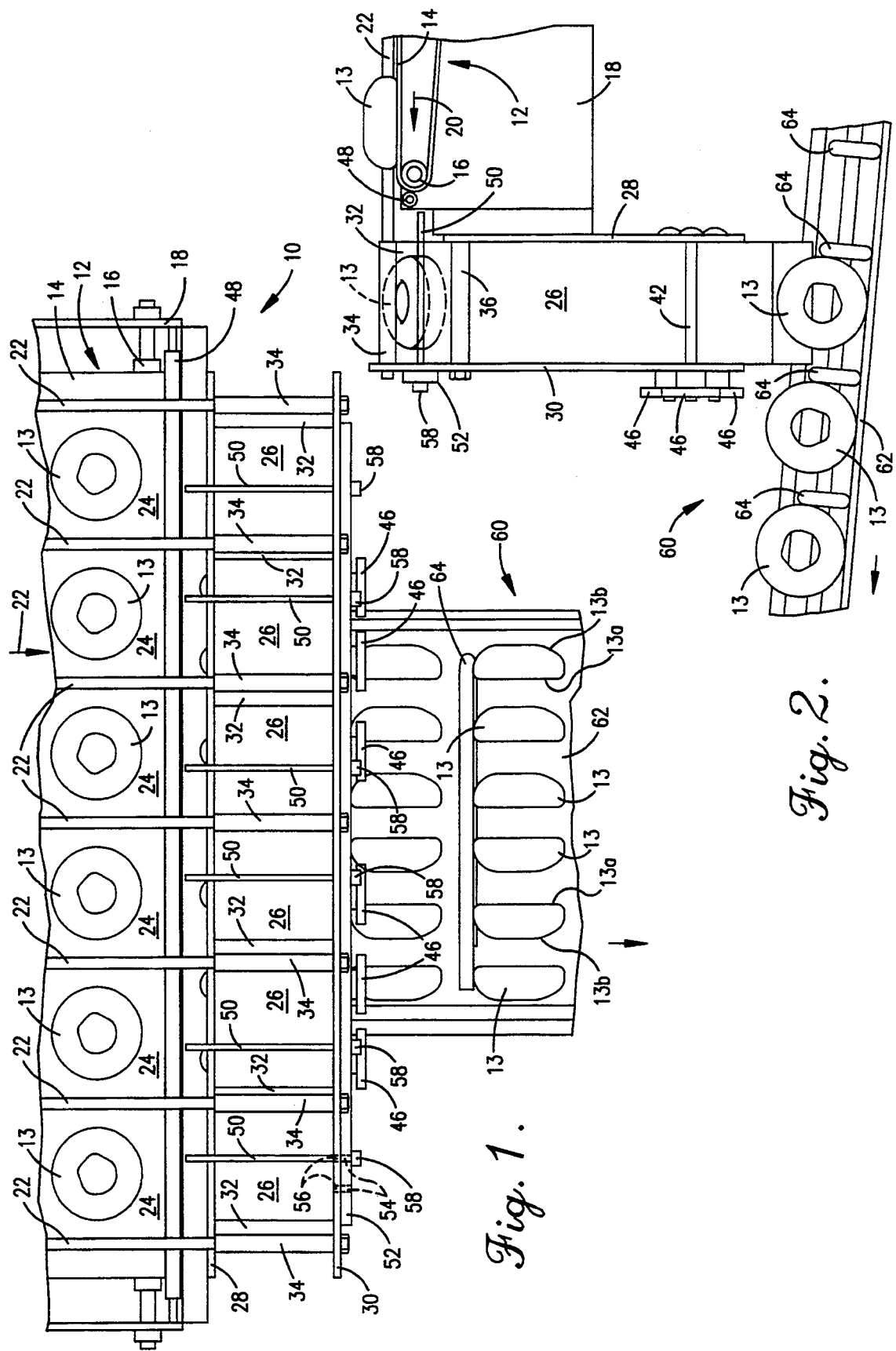

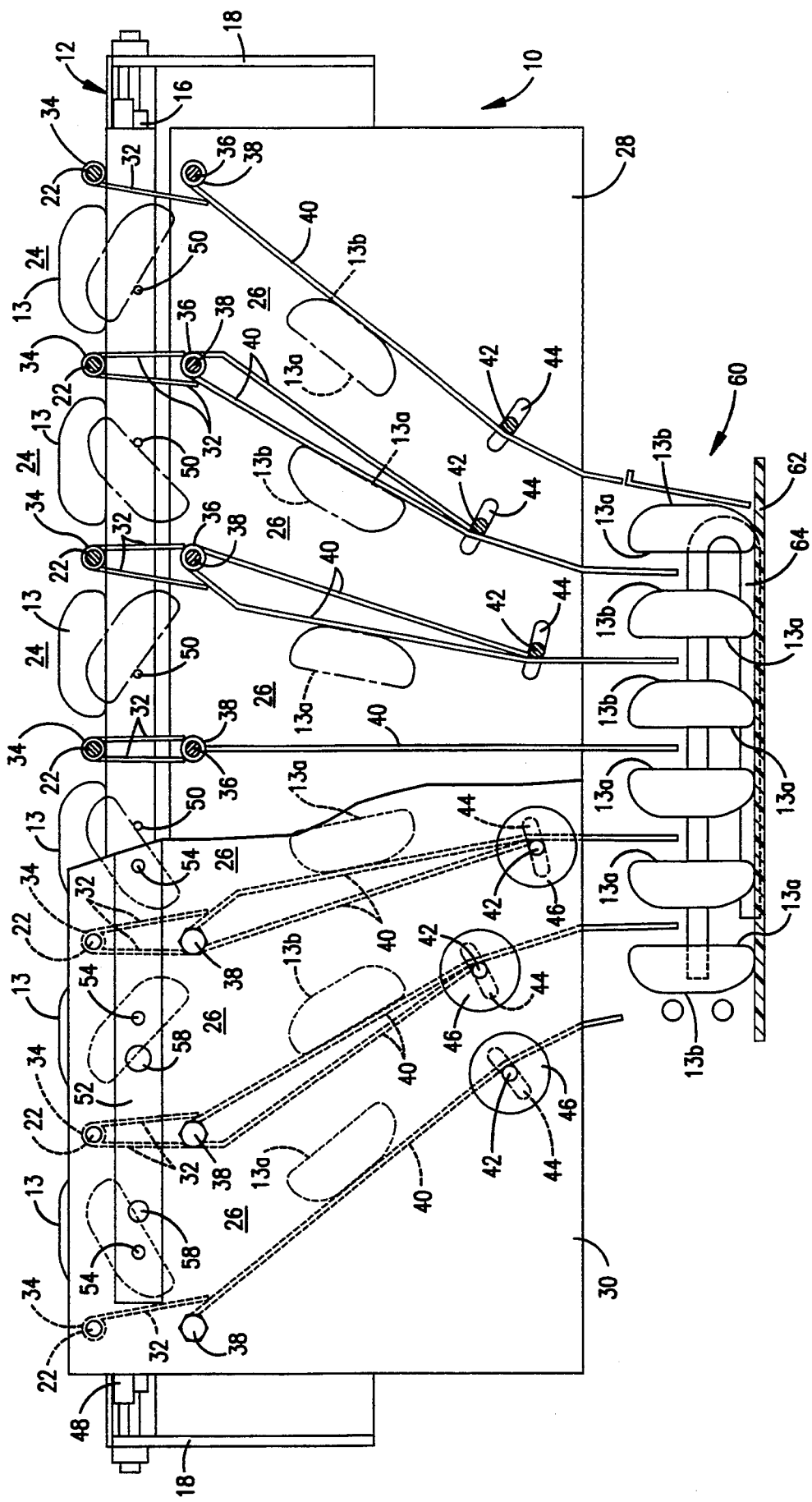

PACKAGING MACHINE FOR BAKERY PRODUCTS

FIELD OF THE INVENTION

This invention relates generally to the packaging of bakery products and deals more particularly with equipment that operates to arrange bakery products in groups having the proper configuration to be packaged.

BACKGROUND OF THE INVENTION

In the bakery industry, the handling of baked goods is for the most part carried out by automated modern equipment. The products which are baked are handled by conveyors and other equipment that arranges them in the necessary configuration to be packaged. Automatic packaging machinery then packages the products in individual packages.

Bakery products such as bagels and English muffins are normally packaged in stacks having the individual products arranged face to face. The baked goods are initially conveyed flatly on their faces, and the need to stack them face to face requires equipment that can arrange the individual products face to face on edge. In addition, the orientation of the individual products in the packages can vary in different packages. For example, if the product has a flat side, some packages may be required to have the flat sides all facing in the same direction, while other packages may have the flat sides facing in one direction on half the package and in the opposite direction on the other half of the package. Other packages may require the products to be arranged in pairs, with the flat sides facing each other in each pair. Because of these different packaging requirements, the equipment that handles the bakery products and arranges them in groups of the proper configuration to be packaged must exhibit considerable flexibility.

SUMMARY OF THE INVENTION

The present invention is directed to a machine which is used in automated packaging equipment to arrange successive groups of bakery products in horizontal stacks each containing a selected number of individual products oriented on edge. It is a particularly important feature of the invention that the orientation of each bakery product can be selectively varied such that either side of each product can be oriented to face in whichever direction is desired for the final package.

In accordance with the invention, bakery products such as bagels or English muffins are initially conveyed on their faces along an infeed conveyor which is separated into one or more lanes by dividers. Each lane is wide enough to accommodate one product, and the products are conveyed in rows oriented transverse to the direction of conveyor movement. Each row contains the number of products that are to be packaged together in the final package.

At the end of the infeed conveyor, one or more open-topped chutes are located adjacent to the ends of the lanes to receive the bakery products that are discharged from the conveyor. A deflector rod is positioned near the open top of each chute at an off center position such that when the products are deposited on the rods, the weight of the products causes them to be tilted or turned through an angle of about 90° to one side or the other as they enter the chutes. This deflection positions the products with their edges facing downwardly, and the products are maintained in this orientation as they slide down the chutes. A conveyor which underlies the chutes receives the bakery products on edge with the sides or faces of the adjacent products facing one another. Each group of products is thus arranged on edge in a horizontal stack as it is deposited on the conveyor. The conveyor then carries the stacks in succession to a packaging machine which carries out the packaging of the bakery products.

It is a particularly important feature of the invention that each deflector rod can be placed in two different alternative positions which are offset on opposite sides of the transverse center of the bakery products that enter the chute. With the rod for a particular chute in one position, the bakery products are rotationally deflected in one direction (for example, such that their flat sides face to the left as the products are discharged from the chute). In the other position of the rod, the bakery products are deflected in the opposite rotational direction (so that the flat sides face in the opposite direction or to the right). Consequently, the orientations of the faces of the bakery products can be customized to the particular package configuration that is desired. By way of example, if all of the deflector rods are placed in one particular position, all products will be turned in the same direction and all flat sides will face in one direction in the finished package. Alternatively, if the rods on one half of the machine are placed in one position and the rods on the other half of the machine are placed in the other position, the products will face in opposite directions on different halves of the package. Still another possibility is to alternate the deflector rod positions across the machine so that each product faces in a direction opposite to the adjacent products. This arranges the bakery products in pairs, with the products in each pair having selected faces facing one another in the package.

The invention is further characterized by adjustability of the sides of the chute. This allows the machine to accommodate different types of products and products that vary in thickness, and it enhances the overall utility and versatility of the machine.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary top plan view of a bakery product packaging machine constructed according to a preferred embodiment of the present invention;

FIG. 2 is a fragmentary sectional view through the packaging machine taken on a vertical plane; and FIG. 3 is a front elevational view, partially in section, of the packaging machine, with portions broken away for purposes of illustration.

DETAILED DESCRIPTION OF THE INVENTION

Referring now to the drawings in more detail, numeral 10 generally designates a portion of a packaging machine which is used to properly arrange bakery products prior to packaging of the products. The bakery products may have virtually any shape such as the round shape of bagels or English muffins. The machine 10 includes an infeed conveyor which is generally identified by numeral 12 and which conveys bakery products such as the bagels 13 shown in the drawings. Conveyor 12 includes a conveyor belt 14 having a horizontal upper surface. The belt 14 is supported in a conventional manner on rollers such as the roller 16 located at the forward end of the conveyor 12. The roller 16 is supported for rotation on frame panels 18 of the machine and may be driven by a conventional motor or the like (not shown) in order to drive the conveyor belt 14 in the direction indicated by the arrow 20 in FIGS. 1 and 2.

The conveyor 12 is provided with a plurality of divider rods 22 which are arranged parallel to one another and are spaced apart across the conveyor belt 14 in order to divide it into a plurality of separate lanes 24 defined between the divider rods 22. Each of the lanes 24 is wide enough to accommodate one of the bagels 13 between the rods 22 on either side of the lane. When the conveyor belt 12 is operating, the bagels 13 are thus conveyed down the lanes 24 one behind the other in each lane, with the bagels in the adjacent lanes grouped in a transverse row which extends across the conveyor belt.

Immediately beyond the forward end of the infeed conveyor 12, a plurality of open topped chutes 26 are provided. One of the chutes 26 is located in alignment with the end of each lane 24 so that the chutes 26 receive the bagels that are discharged from the conveyor belt 14. The back of each of the chutes 26 is formed by a vertical panel 28 which is secured to the conveyor frame. The front of each chute 26 is formed by another vertical panel 30 which is spaced forwardly from panel 28 by a distance greater than the bagel diameter. The upper parts of the sides of the chutes 26 are formed by thin vanes 32 which extend downwardly from sleeves 34. The sleeves 34 are fitted on the forward ends of the divider rods 22, and the opposite vanes 32 for each chute 26 are spaced apart a distance somewhat greater than the bagel diameter. The sleeves 34 extend generally between the panels 28 and 30.

Located below each of the sleeves 34 is another sleeve 36 which is generally overlapped by the overlapping vane or vanes 32. The sleeves 36 are fitted on bolts 38 which extend between the panels 28 and 30. Panels 40 extend downwardly from the sleeves 36 in order to form the lower portions of the sides of the chutes 26. The center panel 40 extends straight downwardly from its sleeve 36, while the remaining panels 40 are inclined such that they converge toward the center as they extend downwardly from the sleeves 36. The panels 40 toward the opposite sides of the machine are inclined to a greater extent than the panels closer to the center of the machine.

The panels 40 (except for the center panels) are adjustable as to their incline in order to adjust the distance between the opposite sides of each chute. The lower portion of each of the adjustable panels 40 is engaged by a horizontal bolt 42 which extends between the panels 28 and 30 and has its head fitting against the back side of panel 28. Each of the bolts 42 fits through inclined slots 44 which are formed in the panels 28 and 30. The end of each bolt 42 adjacent to the front panel 30 is fitted with a hand wheel 46 which is threaded onto the end of the rod. When the hand wheel 46 is tightened on bolt 42 against the front panel 30, it secures the bolt in place. The hand wheel 46 can be loosened in order to allow the bolt 42 to slide within the confines of its slot 44, thus adjusting the position of the lower portion of the corresponding panel 40. When the panel has been positioned as desired, the hand wheel 46 can be tightened to secure it in place.

It is noted that the Converging configuration of the panels 40 results in the chutes 26 being somewhat narrower at their bottom portions than at their top portions. The lower ends of the panels 40 are straight and define a chute width at the bottom that is somewhat greater than the bagel thickness.

Immediately beyond the discharge end of the infeed conveyor 12, a roller 48 is provided to assist in the entry of the bagels into the open top of the chutes 26. The roller 48 extends between the panels 18 located on opposite sides of the conveyor 12.

Each of the chutes 26 is provided at its open top end portion with a deflector rod 50 which rotationally deflects the bagels 13 as they are discharged from the belt conveyor and enter the chutes. Mounted on the front face of panel 30 near its upper end is a transverse metal strip 52. As best shown in FIG. 3, the strip 52 is provided with a series of threaded openings 54. There are two of the openings 54 provided for each of the chutes 26, and the openings 54 for each chute are offset on opposite sides of its transverse center line. Each rod 50 can be inserted through any opening 54 and through an aligned opening 56 (see FIG. 1) which extends through the front plate 30. Each rod 50 has an enlarged head 58, and each rod is threaded adjacent to the head 58 to mate with the threads in opening 54. Each rod 50 is long enough to extend across the entirety of the front to back dimension of each chute 26, and the free ends of the rods terminate adjacent to the roller 18 when the rods are fully inserted and threaded into the openings 54. Because of the locations of the two openings 54 for each rod 50, the rod for each chute 26 can be located on one side or the other of the transverse center of the bagel entering the chute. The rods 50 are horizontal in both positions and are located at an elevation to receive the incoming bakery products on top of them as the products are discharge by the conveyor 12 into the chutes 26.

Underlying the bottom or discharge ends of the chutes 26 is a packaging conveyor which is generally identified by numeral 60. The conveyor 60 includes a horizontal surface 62 and a plurality of spaced apart pusher arms 64 which are generally U-shaped members that extend across the surface 62 and are suitably driven to convey the bagels 13 on edge to a conventional packaging machine (not shown). The pusher arms 64 are spaced apart from one another a distance greater than the bagel diameter. It should be noted that the pusher arms may have a configuration compatible with the products that are being handled.

In operation, round baked goods such as the bagels 13 are flatly conveyed side by side along the infeed conveyor 12 in successive transverse rows each containing the number of bagels that are to be packaged in each individual package. Although the drawings illustrate six of the bagels 13 in each row, it is to be understood that one ore more lanes 24 and chutes 26 can be provided on the machine such that virtually any desired number of bagels can be handled at a time.

When a row of the bagels reaches the forward or discharge end of conveyor 12, the bagels in that row are conveyed by the belt 14 over roller 48 and into the top ends of the chutes 26 onto the deflector rods 50. Because each deflector rod 50 is offset to one side or the other from the center of the bagel, the weight of the bagel causes it to tip or tilt on the rod to one side or the other, depending upon the position of the rod. This tilting or tipping movement caused by the deflector rod rotationally deflects the bagel from its initial face down position on conveyor 12 to what is essentially an edge down position in the chute 26.

As best shown in FIG. 3, the bagels slide down the chute 26 on the panels 40 in this edge down position and are discharged from the chute to the packaging conveyor 60. As the bagels are deposited on the surface 62, they are arranged on edge in a horizontal stack or roll in which the bagels are oriented face to face. The stacks of bagels are conveyed in succession by the pusher arms 64 to the packaging equipment which operates conventionally to package each stack in an individual package.

In this manner, the bagels 13 (or other bakery products) are initially conveyed flatly or face down in a row and are arranged on edge in a stack having the individual products oriented face to face on the packaging conveyor 60 in the configuration in which they are packaged. The locations of the deflector rods 50 and the arrangement of the chutes 26 assure that each group of bakery products will be located on edge in a face to face stack as they are deposited on the packaging conveyor.

The provision of two of the openings 54 for each deflector rod 50 allows the bagel packages to be customized as to the orientations of the sides of the products. For example, it is common for bagels and other bakery products to have a generally flat face 13a on one side and a more rounded face 13b on the other side. In some packaging configurations, the package must have the flat sides 13a all facing inwardly toward the center of the final package. This is the product configuration shown for the stack of bagels deposited on the packaging conveyor 60 in FIG. 3. To accomplish this, the rods 54 for the chutes 26 on the left side of the machine (as viewed in FIG. 3) should all be placed in the opening 54 which is on the right side of the chute. Conversely, the rods for the chutes on the right side of the machine should be placed in the openings 54 on the left side of these chutes. The bagels entering the chutes on the left side of the machine are then deflected by the rod in a counterclockwise turn through approximately 90°. Because the bagels are conveyed on the belt 14 with the flat sides 13a facing downwardly, a counterclockwise deflection of the bagels as they enter the chutes causes the flat side to face to the right which is the desired orientation for the bagels on the left side of the machine. The bagels on the right side of the machine are deflected counterclockwise through approximately 90° which is opposite the rotational deflection of the bagels on the left side of the machine. The bagels on the right side of the machine are thus oriented with their flat sides 13a facing to the left which is the desired orientation in a package having all of the flat sides facing toward the center of the package.

Another package configuration can have all of the flat sides 13a facing in the same direction. This can be accomplished by placing all of the rods 50 in the left opening 54 of each chute or all of the rods in the right opening of each chute, depending upon which direction it is desired for the flat faces 13a to face.

Another possible package configuration has the bakery products arranged in pairs, with the flat sides of the products in each pair facing toward one another. This is accomplished by alternating the positions of the deflector rods in the adjacent chutes. For example, the rod configuration shown in FIGS. 1 and 3 has the rod 50 for the left most chute located in the right opening 54 for that chute. The adjacent chute has the rod 50 located in the left opening, and this staggering of the rod positions continues across the machine. As best shown in FIG. 3, the bagel for the chute that is farthest to the left is deflected in a counterclockwise direction, while the bagel in the second chute is deflected oppositely or in a clockwise direction. The bagels in the two center chutes are similarly deflected in opposite directions, as are the bagels in the two right most chutes. This results in the two left most bagels having their faces 13a disposed adjacent to one another, the two center bagels have their faces 13a adjacent to one another, and the two right most bagels having their faces 13a adjacent to one another. The overall result is that the final package has the bagels arranged in pairs each having their flat faces 13a together.

Consequently, the provision of two alternative positions for each of the rods 50, with one position being on one side of the transverse center line of the product and the other position being offset on the opposite side of the center line, allows virtually any desired orientation in the final package for the faces of the products.

The widths of the lower portions of the chutes can be adjusted to handle products that differ in widths. This is accomplished by loosening the hand wheels 46 and sliding the bolts 52 in their slot 44 to the desired positions to accommodate the width of the product that is to be handled. The hand wheels 46 can then be tightened to secure the rods 42 in place and set the width of each chute 26.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A machine for use in the packaging of bakery products, comprising:
    an infeed conveyor for conveying the bakery products in successive rows each containing a plurality of the bakery products lying flatly side by side with the other bakery products in the row and each oriented transverse to the direction of movement of the bakery products;
    a plurality of chutes at an end of said infeed conveyor, each chute having an open top for receiving one of the bakery products in each row;
    a deflector for each chute for rotationally deflecting each bakery product that enters the chute to an orientation in which an edge of the bakery product faces generally downwardly;
    means for retaining each deflector adjacent the open top of the corresponding chute at two different alternative positions located on opposite sides of the transverse center of the bakery product entering the chute, thereby allowing each deflector to be selectively located to deflect the bakery products in opposite rotational directions; and conveyor means underlying said chutes for receiving the bakery products discharging from the chutes on edge and for conveying the bakery products on edge in groups containing the bakery products arranged generally face to face.

2. A machine as set forth in claim 1, including a plurality of generally parallel dividers separating the infeed conveyor into a plurality of lanes each wide enough to receive and convey the bakery products one behind the other, each lane having a terminal end adjacent one of the chutes.

3. A machine as set forth in claim 1, wherein said chutes have sides arranged to guide the bakery products such that they are closer together at the bottoms of the chutes than at the tops of the chutes.

4. A machine as set forth in claim 3, including means for adjusting the sides of the chutes toward and away from one another.

5. A machine for arranging bakery products on edge in a stack comprising:

an infeed conveyor for conveying the bakery products along a predetermined path with the bakery products lying flatly, said path having at least one lane along which successive bakery products are conveyed one behind the other;

at least one chute, each chute being arranged adjacent to a terminal end of a corresponding lane and each chute having an open top for receiving a bakery product discharged from the terminal end of the adjacent lane;

a deflector for each chute for rotationally deflecting each bakery product from a face down position entering the chute to an edge down position within the chute;

means for retaining each deflector at two different alternative positions offset on opposite sides of the transverse center of the bakery product entering the corresponding chute to effect deflection of the bakery products in opposite rotational directions at the different positions of the deflector; and conveyor means underlying each chute for receiving the bakery products on edge and conveying the bakery products away from the chute in successive stacks each including at least one bakery product oriented on its edge.

6. A machine as set forth in claim 5, wherein each chute has sides arranged to guide the bakery products such that they are closer together at the bottoms of the chute than at the top of the chute.

7. A machine as set forth in claim 6, including means for adjusting the sides of each chute toward and away from one another.

8. In a packaging machine for generally round bakery products which have opposite faces and edge portions and which are conveyed in successive transverse rows each containing a selected number of bakery products oriented face down, the improvement comprising:

a plurality of chutes arranged side by side to receive the bakery products in each row, each chute having an open top;

a deflector for each chute having two different alternative positions adjacent the top of the chute located on opposite sides of the transverse center of each bakery product entering the chute face down, said deflectors acting to rotationally deflect the bakery products to positions in which the edge portions thereof face generally downwardly, with the direction of rotational deflection being opposite at the different positions of each deflector;

a conveyor surface underlying said chutes for receiving the edge portions of the bakery products discharging therefrom; and means for conveying the bakery products along said conveyor surface in successive groups each having said selected number of bakery products arranged generally face to face and conveyed on said edge portions.

9. A machine as set forth in claim 8, wherein said chutes have sides arranged to guide the bakery products such that they are closer together at the bottoms of the chutes than at the tops of the chutes.

10. A machine as set forth in claim 9, including means for adjusting the sides of the chutes toward and away from one another.

* * * * *